United States Patent
Gustafson et al.

(10) Patent No.: US 9,710,774 B2
(45) Date of Patent: *Jul. 18, 2017

(54) CONFIGURATION OF EMBEDDED INTELLIGENCE

(71) Applicant: Workday, Inc., Pleasanton, CA (US)

(72) Inventors: Paul Gustafson, Moraga, CA (US); Jonathan David Ruggiero, Walnut Creek, CA (US); Bruce Shay, San Leandro, CA (US); Nick Pouschine, Fremont, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,974

(22) Filed: Nov. 19, 2015

(65) Prior Publication Data

US 2016/0148131 A1 May 26, 2016

Related U.S. Application Data

(63) Continuation of application No. 13/443,185, filed on Apr. 10, 2012, now Pat. No. 9,223,462.

(51) Int. Cl.
| | |
|---|---|
| *G06F 3/0481* | (2013.01) |
| *G06Q 10/06* | (2012.01) |
| *G06F 9/455* | (2006.01) |
| *G06Q 10/10* | (2012.01) |

(52) U.S. Cl.
CPC ....... *G06Q 10/0633* (2013.01); *G06F 3/0481* (2013.01); *G06F 9/45533* (2013.01); *G06Q 10/067* (2013.01); *G06Q 10/1053* (2013.01)

(58) Field of Classification Search
CPC ............ G06Q 10/0633; G06Q 10/1053; G06F 3/0481; G06F 9/45533
See application file for complete search history.

(56) References Cited

U.S. PATENT DOCUMENTS

| | | | |
|---|---|---|---|
| 8,024,651 B1 | 9/2011 | Error | |
| 2002/0052771 A1* | 5/2002 | Bacon | G06Q 10/06316 705/7.26 |
| 2002/0069214 A1* | 6/2002 | Smith | G06Q 10/10 715/234 |
| 2003/0140089 A1 | 7/2003 | Hines | |
| 2004/0024622 A1* | 2/2004 | Knight | G06Q 10/10 705/7.37 |

(Continued)

OTHER PUBLICATIONS

Gotz, David, et al. "HARVEST: an intelligent visual analytic tool for the masses." Published in Procceding IVITA '10 Proceedings of the first international workshop on Intelligent visual interfaces for text analysis, Feb. 7, 2010, ISBN: 978-1-60558-996-1 (pp. 1-4).

(Continued)

*Primary Examiner* — Charles E Anya
(74) *Attorney, Agent, or Firm* — Van Pelt, Yi & James LLP

(57) ABSTRACT

A system for configuration of embedded intelligence comprises a processor and a memory. The processor is configured to associate a prompt of an embedded intelligence applet with an exposed field of a process. The memory is coupled to the processor and is configured to provide the processor with instructions. The memory is configured to store the process definition.

24 Claims, 7 Drawing Sheets

(56) References Cited

U.S. PATENT DOCUMENTS

| | | | | |
|---|---|---|---|---|
| 2004/0039990 | A1* | 2/2004 | Bakar | G06F 17/243 715/222 |
| 2004/0078461 | A1* | 4/2004 | Bendich | G06F 11/3495 709/224 |
| 2005/0216282 | A1* | 9/2005 | Chen | G06F 17/30607 717/108 |
| 2006/0143220 | A1* | 6/2006 | Spencer | G06F 8/20 |
| 2007/0106642 | A1* | 5/2007 | Kovrigin | G06Q 10/06 |
| 2007/0226241 | A1* | 9/2007 | Ng | G06F 17/3056 |
| 2007/0250840 | A1* | 10/2007 | Coker | G06F 9/54 719/320 |
| 2010/0017783 | A1* | 1/2010 | Brininstool | G06F 8/20 717/101 |
| 2010/0250486 | A1* | 9/2010 | Brunner | G06F 17/3089 707/603 |
| 2012/0089636 | A1* | 4/2012 | Qayyum | G06F 17/30572 707/769 |

OTHER PUBLICATIONS

Skarnes et al. Method and Apparatus for Applet-Generated Screen Displays Using Computer Database and Programming Language, Oct. 25, 2001, WIPO.

* cited by examiner

CONFIGURATION OF EMBEDDED INTELLIGENCE

CROSS REFERENCE TO OTHER APPLICATIONS

This application is a continuation of U.S. patent application Ser. No. 13/443,185 issued as U.S. Pat. No. 9,223,462 entitled CONFIGURATION OF EMBEDDED INTELLIGENCE filed Apr. 10, 2012 which is incorporated herein by reference for all purposes.

BACKGROUND OF THE INVENTION

A business manager makes many complex decisions over the course of each day. Enterprise business software has come to be relied upon for assisting a manager with his decision making by presenting him with data relevant to these decisions. For example, a manager who is considering giving an employee a raise might want to see data regarding the amount and timing of raises given to employees in the past, sorted by business division and employee performance level. Setting up this type of data analysis traditionally requires some level of software programming, and is not typically integrated into the decision making process. A manager would have to request the services of technical staff to prepare code for the report and utilizing the report would require switching tasks between report viewing and decision making.

BRIEF DESCRIPTION OF THE DRAWINGS

Various embodiments of the invention are disclosed in the following detailed description and the accompanying drawings.

DETAILED DESCRIPTION

Figure 1:
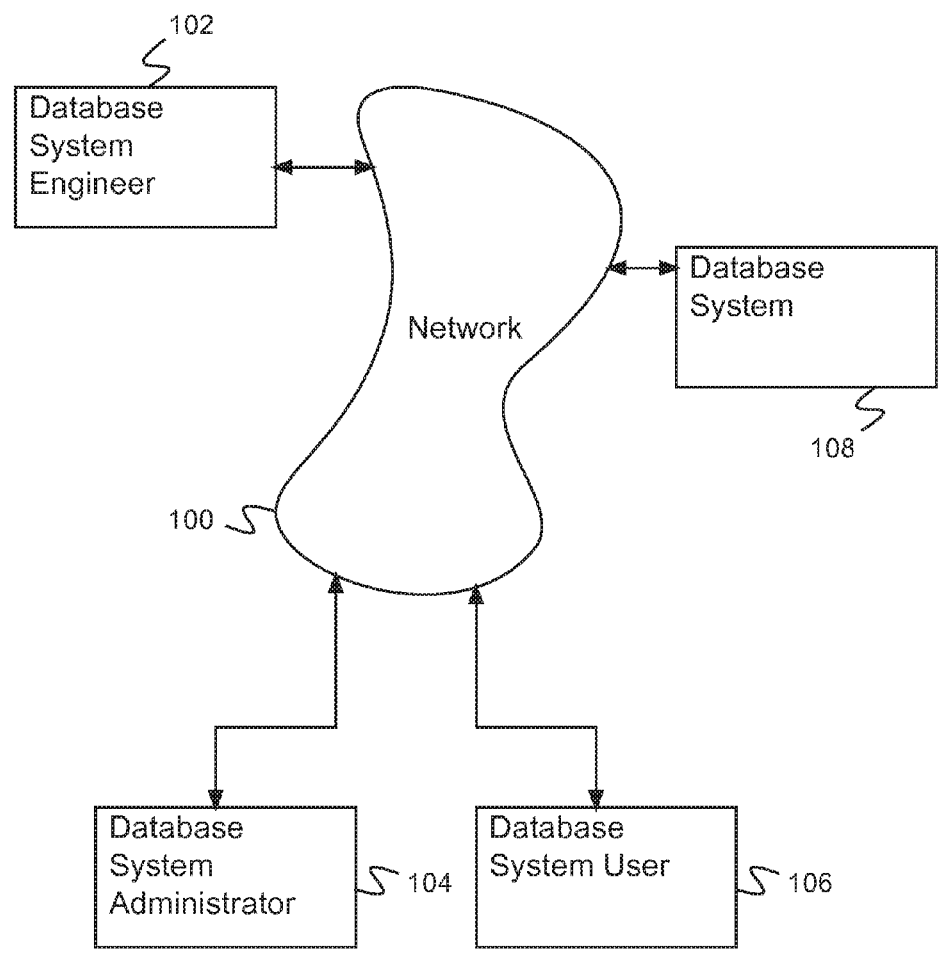
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for configuration of embedded intelligence comprises a processor configured to associate a prompt of an embedded intelligence applet with an exposed field of a business process, and a memory coupled to the processor and configured to provide the processor with instructions and to store the business process definition. In some embodiments, the business process definition is stored with the associated embedded intelligence applet.

Configuration of embedded intelligence is disclosed. A human resources and financial software application comprises a database, a set of business processes, and a set of embedded intelligence applets. Each business process modifies or accesses data stored in the database to accomplish a business process, e.g., hire an employee, modify the salary of an employee, give an employee a promotion, enter an invoice, etc. Each embedded intelligence applet prepares a report on data stored within the database to assist a business manager with the decisions made in the business processes. The embedded intelligence applets are made available automatically for the user of the business process so that no switching to another application is necessary in order for the functionality of the embedded intelligence applet to be visible, available, or interactive for the user. In various embodiments, the embedded intelligence applet is automatically triggered, is automatically made visible, is automatically made to be interactive with the user, is automatically launched, is automatically updated based on new values of input or updated input, or any other appropriate trigger. Embedded intelligence applets are created with a standard report writer user interface that does not require technical skill. So that the configuration of the embedded intelligence applet does not require a high degree of technical skill—for example, a computer skill level of a programmer, or a computer specialist, or a system administrator. When a report has been created with the report writer user interface, it is then enabled as an embedded intelligence applet, if it meets certain criteria. An embedded intelligence applet may include a set of prompts, e.g., variables that need to be supplied to the embedded intelligence applet in order for it to run. An embedded intelligence applet that provides the salary for each employee of a certain job profile could take as input a job profile to find salaries of, or an employee to search salaries of employees with the same job profile. When an embedded intelligence applet is added to a business process, the prompts have their values supplied by business process exposed fields. Business process exposed fields comprise data fields made available by the business process for use by embedded intelligence applets. For example, an embedded intelligence applet takes as an input an output provided by exposed fields that are available from a business process. These fields comprise available variables from the business process that can be output to provide input values to the embedded intelligence applet.

FIG. 1 is a block diagram illustrating an embodiment of a network system. In the example shown, the network system comprises database system engineer 102, database system administrator 104, database system user 106, and database system 108, communicating via network 100. In various embodiments, network 100 comprises one or more of the following: a local area network, a wide area network, a wired network, a wireless network, the Internet, or any other appropriate network. Database system 108 comprises a database system for storage and retrieval of information. In some embodiments, database system 108 comprises a system for analysis of information. In some embodiments, database system 108 comprises a distributed database, e.g., a database system comprising multiple computers not necessarily in the same location. In some embodiments, database system 108 comprises a system for executing business processes. In some embodiments, database system 108 comprises a system for executing embedded intelligence applets. In some embodiments, database system 108 comprises a system for configuring embedded intelligence. Database system engineer 102 comprises a database system engineer developing software that exists as part of database system 108. In some embodiments, database system engineer 102 is an employee of a database system software vendor. In some embodiments, database system engineer 102 configures and modifies database system 108 in ways not available to database system administrator 104 or database system user 106. Database system engineer 102 accesses database system 108 to create, prepare, or configure database services. In various embodiments, database services comprise financial database services, human resources database services, business process database services, content management database services, enterprise database services, or any other appropriate database services.

Database system administrator 104 comprises a database system administrator administrating database system 108. In some embodiments, database system administrator 104 comprises an employee at a company purchasing database system services. In some embodiments, administrating database system 108 comprises preparing, configuring, or modifying database system 108 as desired by database system users (e.g., database system user 106). In some embodiments, database system administrator 104 configures and modifies database system 108 in ways not available to database system user 106. Database system user 106 comprises a database user accessing database services on database system 108. In some embodiments, database system user 106 comprises an employee at a company purchasing database system services. In various embodiments, there are 1, 2, 4, 13, 22, 115, or any other appropriate number of database system users accessing database services on database system 108. In some embodiments, each database system user only has access to their own data stored on database system 108 and is able to utilize database system 108 as though they are the sole database system user. In some embodiments, software and data on database system 108 is owned and maintained by database system engineer 102 and access to database system 108 is provided to database system user 106 as a service. In some embodiments, database system user 106 configures services on database system 108. In some embodiments, the ability of database system user 106 to configure database system 108 is limited compared with that of database system engineer 102 or database system administrator 104. In some embodiments, a database system user (e.g., database system user 106) comprises a person accessing database system 108 via a user interface, e.g., a web page. In some embodiments, a database system user comprises an automated system accessing database system 108 via a machine interface, e.g., a public application programming interface (API).

Figure 2:
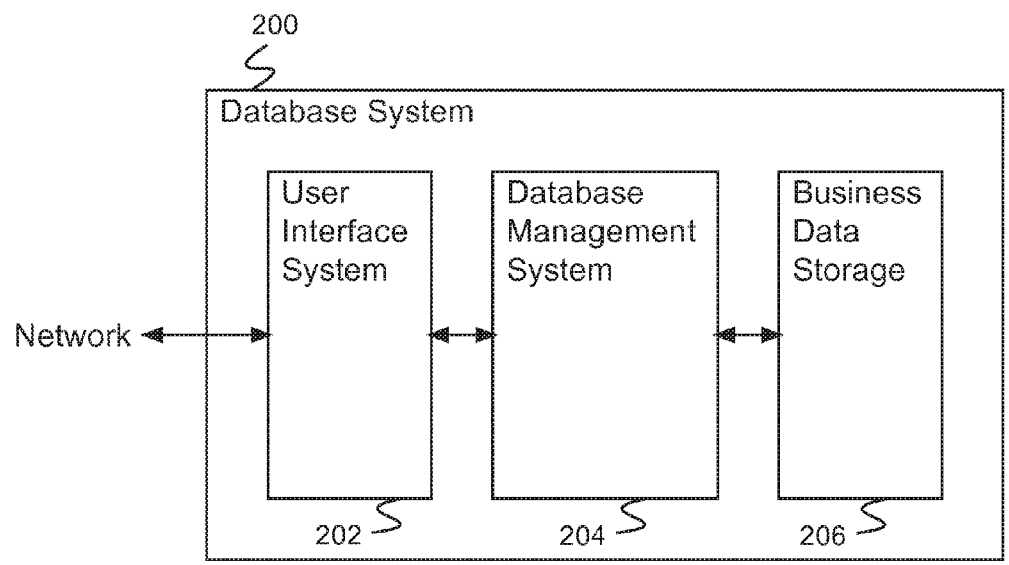
FIG. 2 is a block diagram illustrating an embodiment of a database system.

FIG. 2 is a block diagram illustrating an embodiment of a database system. In some embodiments, database system 200 comprises database system 108 of FIG. 1. In the example shown, user interface system 202 communicates with a network, e.g., network 100 of FIG. 1. User interface system 202 comprises a system for interacting with a user over a network, e.g., a web page server. In various embodiments, a user uses user interface system 202 for querying database system 200, initiating jobs running on database system 200, modifying jobs running on database system 200, uploading data to database system 200, configuring database system 200, scheduling jobs to run at a particular time on database system 200, scheduling jobs to run at recurring intervals on database system 200, or any other appropriate use. Database management system 204 comprises a system for managing database system 200. Database management system 204 comprises software for organizing data, retrieving data, processing data, storing data, preparing reports from data, analyzing data, interpreting data, or any other appropriate function. Data is stored in business data storage 206. In some embodiments, database system 200 comprises an object-oriented database. In some embodiments, database system 200 comprises a distributed database.

Figure 3:
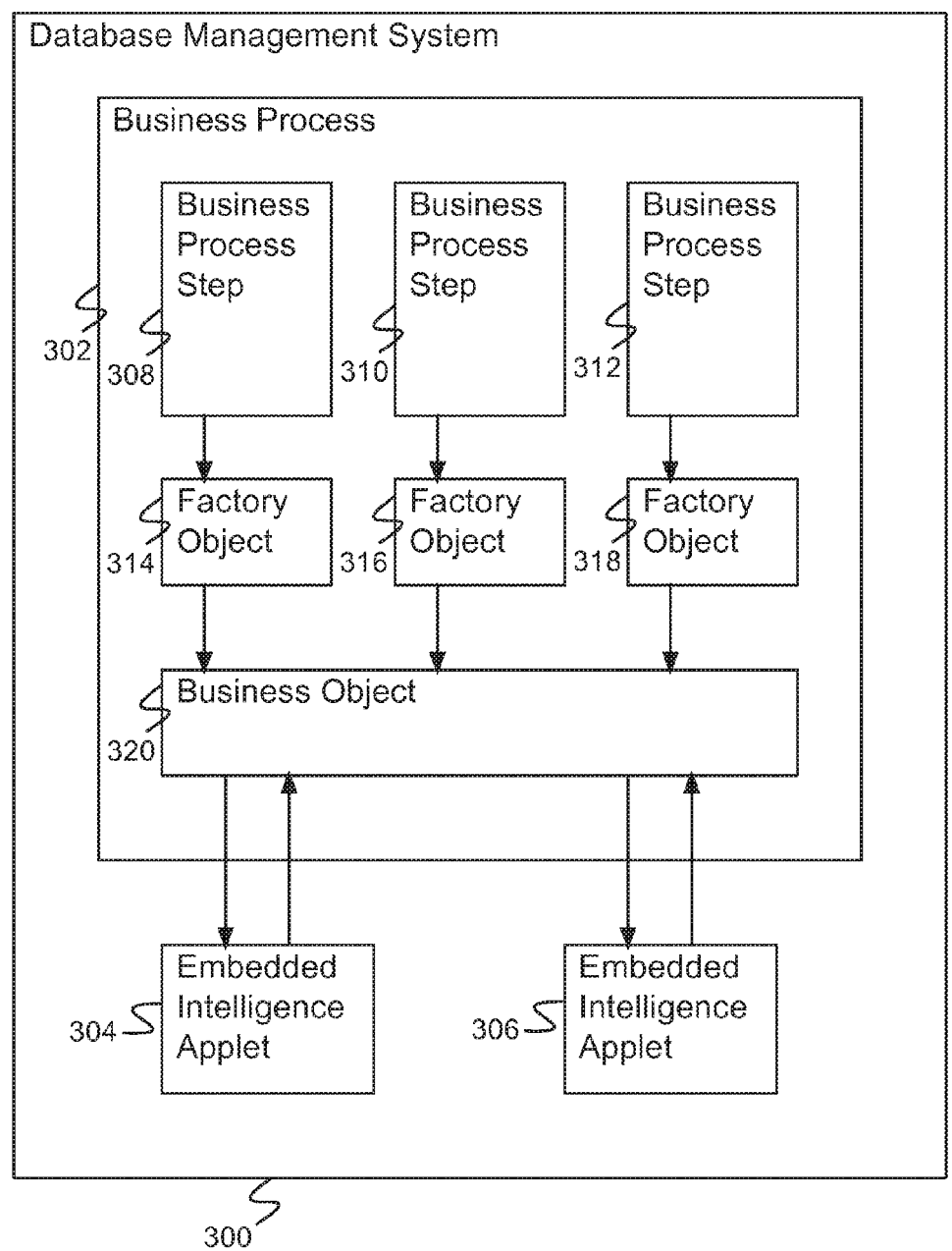
FIG. 3 is a block diagram illustrating an embodiment of a database management system.

FIG. 3 is a block diagram illustrating an embodiment of a database management system. In some embodiments, database management system 300 comprises database management system 204 of FIG. 2. In the example shown, database management system 300 comprises business process 302, embedded intelligence applet 304, and embedded intelligence applet 306. In some embodiments, database management system 300 includes more than one business process. In various embodiments, database management system 300 comprises 1, 2, 4, 7, 11, 14, 22, 315, 1009, 3021, or any other appropriate number of business processes. A business process comprises software for executing a business task, e.g., hiring an employee, modifying the salary of an employee, giving an employee a promotion, transferring an employee between business divisions, approving an invoice, or any other appropriate business task. In some embodiments, a business task comprises a modification to the database in order to reflect a change in the business structure or in the characteristics of an element of the business structure (e.g., an employee, a business division, a business site). Business processes contain a number of fields to be filled out in the course of executing the business process, e.g., employee name, new employee salary, new employee title, new employee business division, or any other appropriate business process field. Embedded intelligence applet 304 and embedded intelligence applet 306 communicate with business process 302. Database management system 300 comprises any appropriate number of embedded intelligence applets. Each embedded intelligence applet (e.g., embedded intelligence applet 304, embedded intelligence applet 306) communicates with any appropriate number of business processes (e.g., business process 302). In various embodiments, database management system 300 comprises 1, 3, 4, 6, 12, 22, 222, 515, or any other appropriate number of embedded intelligence applets. An embedded intelligence applet comprises software for analyzing data and preparing a report embedded with a business process. In some embodiments, analyzing data comprises preparing a useful set of data for assisting a database system user (e.g., database system user 106 of FIG. 1) executing a business task. In various embodiments, analyzing data comprises retrieving data from data storage, processing data, filtering data, comparing data, performing mathematical functions on data, selecting appropriate data, or any other appropriate data analysis task. In some embodiments, preparing a report comprises preparing a data presentation for assisting a database system user executing a business task. In various embodiments, preparing a report comprises preparing a graph, preparing a chart, preparing a data table, selecting data to report, selecting a comparison of data to report, or any other appropriate report preparation task. In some embodiments, an embedded intelligence applet is referred to as a worklet. When a database system user accesses the database system (e.g., database system 108 of FIG. 1) and executes a business process (e.g., business process 302), embedded intelligence applets communicating with the business process (e.g., embedded intelligence applet 304, embedded intelligence applet 306) are shown embedded in the business process. The embedded intelligence applets are designed to provide the database system user with intelligence in order to assist with decisions made during the execution of the business process. For instance, a salary modification business process requires the database system user to input the new salary as part of the process, thus the user must decide what the new salary ought to be. An embedded intelligence applet embedded with the salary modification process prepares information relevant to that decision, e.g., job performance of the employee, recent salary modifications of employees in the same division, average time between salary modifications and time since the employee's last salary modification, or any other appropriate information.

In some embodiments, the embedded intelligence applet provides information by receiving the input information associated with the process and looks for related information in the database. For example, in the event that a raise process is being used, the applet provides salary data for employees with the same job classification (e.g., laterally relevant data), provides employee salary data (e.g., background data, or vertically relevant data, etc.), provides employee data for those with salary similar to the contemplated raise salary (e.g., forecasted laterally relevant data), or any other appropriate data. In some embodiments, related information comprises results from a search on a database (e.g., an object database). In some embodiments, the search on the database comprises a search based at least in part on an attribute of an object received as an input object. In some embodiments, the search on the database comprises a search based at least in part on an attribute of an object related to the input object.

Business process 302 is divided into business process step 308, business process step 310, and business process step 312. In various embodiments, a business process is broken into 1, 2, 3, 5, 7, 10, or any other appropriate number of steps. Each step contains a subset of the fields a database system user is to fill out in order for the business process to complete. As a business process evolves, (e.g., through revisions to the software), the number of steps the business process is divided into can change (e.g., more decisions are added, the decisions are spread out among a larger number of steps). Business process 302 additionally comprises factory object 314, factory object 316, and factory object 318. Factory object 314 is associated with business process step 308, factory object 316 is associated with business process step 310, and factory object 318 is associated with business process step 312. Each factory object gathers data entered into fields on its associated business process step and reports the data to business object 320. For instance, if an employee name is entered into an employee name field in business process step 308, factory object 314 will detect the employee name and report it to business object 320. Business object 320 collects data from the factory objects and presents the data to embedded intelligence applet 304 and embedded intelligence applet 306 in a documented and consistent format. For instance, if business process 302 comprises a modify employee salary business process, and business process step 310 includes a new employee salary field, factory object 316 will register data entered into the new employee salary field and report it to business object 320, which will then present it to embedded intelligence applet 304 and embedded intelligence applet 306 in the documented and consistent format. If business process 302 evolves (e.g., through revisions to the software) and the business process step that includes the new employee salary field is changed, the factory objects are changed correspondingly such that business object 320 still receives data entered into the new employee salary field and is able to report the data in the same manner as prior to the business process evolution.

Embedded intelligence applet 304 and embedded intelligence applet 306 receive data from business object 320 as part of their data analysis and report preparation. For instance, when a user enters an employee name into a modify employee salary process, embedded intelligence applet 304 and embedded intelligence applet 306 receive the employee name and can execute further data analysis and report preparation based on it, e.g., finding the performance records of the employee and presenting them to the database user. In some embodiments, database management system 300 comprises a processor configured to associate a prompt of an embedded intelligence applet (e.g., embedded intelligence applet 304) with an exposed field of a business process (e.g., business process 302) and a memory coupled to the processor and configured to provide the processor with instructions and to store the business process definition with the associated embedded intelligence applet.

In some embodiments, the business process with its associated embedded intelligence applet has the ability to add/remove steps in the business process and yet still allow the embedded intelligence applet to trigger where their prompts have been satisfied (e.g., the linkage from exposed fields of the business process are output or transferred to the embedded intelligence applet as inputs).

Figure 4:
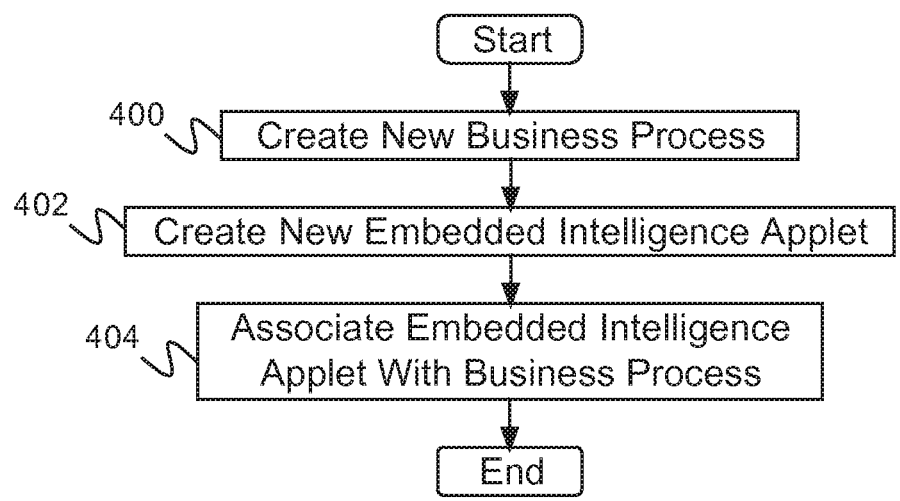
FIG. 4 is a flow diagram illustrating an embodiment of a process for creating a business process and associating it with an embedded intelligence applet.

FIG. 4 is a flow diagram illustrating an embodiment of a process for creating a business process and associating it with an embedded intelligence applet. In some embodiments, the process of FIG. 4 is executed by a database system engineer (e.g., database system engineer 102 of FIG. 1). In some embodiments, part of the process of FIG. 4 is executed by a database system engineer and part of the process of FIG. 4 is executed by a database system administrator (e.g., database system administrator 104 of FIG. 1). In the example shown, in 400, a new business process (e.g., a business process as in business process 302 of FIG. 3) is created. In 402, a new embedded intelligence applet (e.g., an embedded intelligence applet as in embedded intelligence applet 304 of FIG. 3) is created. In 404, the embedded intelligence applet is associated with the business process.

Figure 5:
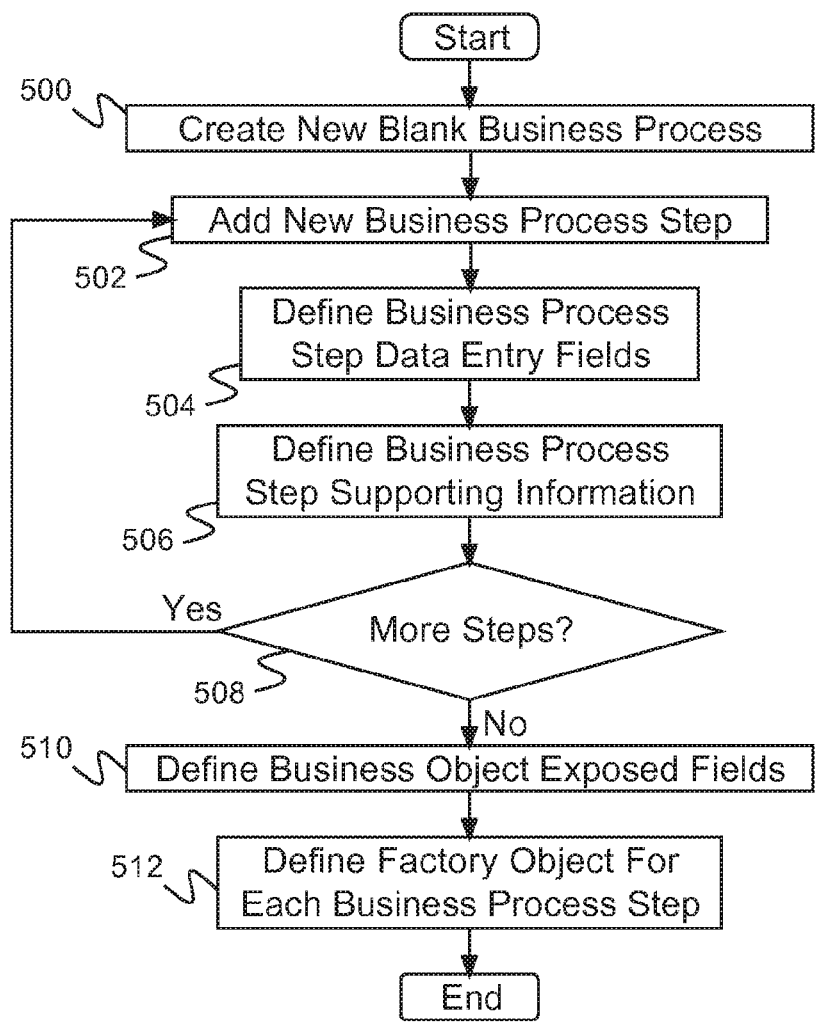
FIG. 5 is a flow diagram illustrating an embodiment of a process for creating a new business process.

FIG. 5 is a flow diagram illustrating an embodiment of a process for creating a new business process. In some embodiments, the process of FIG. 5 is executed by a database system engineer (e.g., database system engineer 102 of FIG. 1). In some embodiments, the process of FIG. 5 implements 400 of FIG. 4. In the example shown, in 500, a new blank business process (e.g., a business process as in business process 302 of FIG. 3, comprising no business process steps) is created. In 502, a new business process step (e.g., a business process step as in business process step 308 of FIG. 3) is added to the business process. In 504, business process step data entry fields are defined. Business process step data entry fields comprise data entry fields for a user (e.g., database system user 106 of FIG. 1) to enter business process data. In 506, business process step supporting information is defined. Business process step supporting information comprises data shown by the business process in order to assist the business process user in making decisions. In some embodiments, business process step supporting information is defined by a database system engineer and is not able to be modified by a database system administrator or a database system user. In 508, it is determined whether more steps are desired in the business process. In the event that more steps are desired in the business process, control passes to 502. In the event that more steps are not desired in the business process, control passes to 510. In 510, business object exposed fields are defined. Business object exposed fields comprise data fields that are exposed by a business object (e.g., business object 320 of FIG. 3) and are accessible by embedded intelligence applets (e.g., embedded intelligence applet 304 of FIG. 3, embedded intelligence applet 306 of FIG. 3). In various embodiments, business object exposed data comprises the data entered into the business process step data entry fields, a subset of the data entered in the business process step data entry fields, a processed version of data entered into the business process step data entry fields, data extracted from data storage (e.g., business data storage 206 of FIG. 2), a processed version of data extracted from data storage, or any other appropriate data. In 512, a factory object (e.g., factory object 314 of FIG. 3) is defined for each business process step. The factory object acquires data from the business process step and delivers it to the business object, so that it can be made available as business object exposed data. In the event that the database system engineer builds a revised version of the business process at a later point in time, the business process steps and factory objects may change, but as long as the business object remains consistent, any embedded intelligence applets built to work with the business process will still work.

Figure 6:
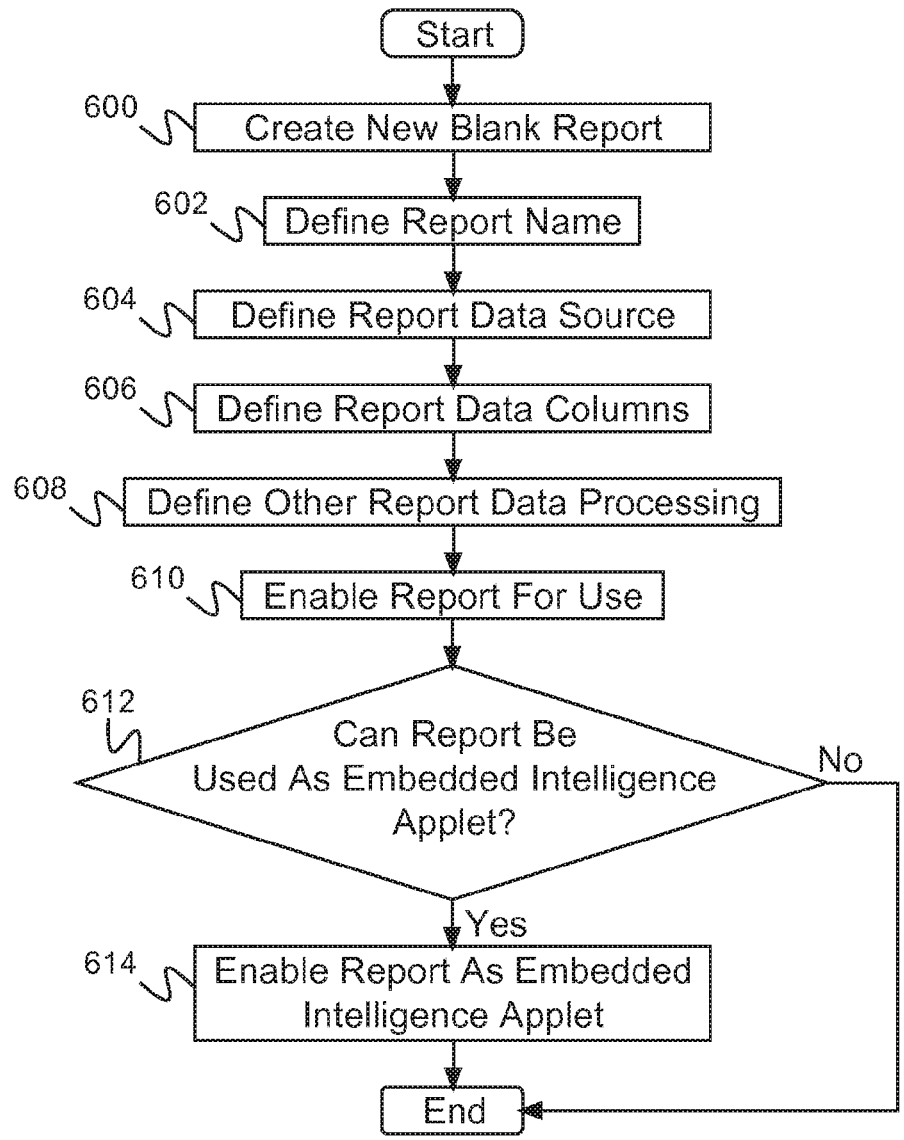
FIG. 6 is a flow diagram illustrating an embodiment of a process for creating a new embedded intelligence applet

FIG. 6 is a flow diagram illustrating an embodiment of a process for creating a new embedded intelligence applet. For example, an embedded intelligence applet as in embedded intelligence applet 304 of FIG. 3. In some embodiments, the process of FIG. 6 is executed by a database system engineer (e.g., database system engineer 102 of FIG. 1). In some embodiments, the process of FIG. 6 is executed by a database system administrator (e.g., database system administrator 104 of FIG. 1). In some embodiments, the process of FIG. 6 implements 402 of FIG. 4. In the example shown, in 600, a new blank report is created. In some embodiments, a report comprises software for collecting data (e.g., from a data storage as in business data storage 206 of FIG. 2) and presenting the data to a user (e.g., database system user 106 of FIG. 1). In some embodiments, a report comprises software for receiving data from a user, collecting stored data, wherein the stored data collected is based at least in part on the data received from the user, and presenting the stored data to the user. In some embodiments, a report processes data before presenting it to the user. In some embodiments, a blank report comprises a report that does not have any data collection or presentation defined. In 602, a report name is defined. In some embodiments, a report name is used by a user for identifying the report at a later time. In 604, a report data source is defined. In some embodiments, a report data source comprises a set of data objects stored in a data storage (e.g., in business data storage 206 of FIG. 2). In some embodiments, a report data source comprises a method that returns a set of objects from a data storage. The set of objects identified by the report data source becomes rows of a grid-based report. In 606, report data columns are defined. Report data columns comprise columns of a grid-based report. In some embodiments, the report data columns comprise object attribute fields of the objects identified by the report data source. In 608, other report data processing is defined. In various embodiments, other report data processing comprises data sorting, data filtering, data prompts, output data processing, or any other appropriate other report data processing. In various embodiments, data sorting comprises sorting data rows (e.g., rows comprising the objects identified by the report data source defined in 604) by data in a column (e.g., a report data column defined in 606) alphabetically, numerically, or any other appropriate way. In various embodiments, data filtering comprises reducing the data set displayed (e.g., reducing the set of objects identified by report data source defined in 604) by selecting only those objects that have an attribute that matches a predefined value, by selecting only those objects that have an attribute that matches one of a predefined set of values, by selecting only those objects that have an attribute that falls into a predefined range, or in any other appropriate way. In various embodiments, data prompts comprise report data source prompts (e.g., the report user is prompted for information that defines one or more characteristics of the report data source), data sorting prompts (e.g., the report user is prompted for information that defines one or more characteristics of the data sorting), data filter prompts (e.g., the report user is prompted for information that defines one or more characteristics of the data filter), or any other appropriate prompts. In various embodiments, output data processing comprises data formatting instructions, data plotting or graphing instructions, or any other appropriate output data processing.

In 610 the report is enabled for use. In various embodiments, enabling the report for use comprises storing the report, adding the report name to a list of available reports, causing the report to appear in report search results, notifying users of the availability of the report, or enabling the report for use in any other appropriate way. In 612 it is determined if the report can be used as an embedded intelligence applet. In various embodiments, the report can be used as an embedded intelligence applet if its number of columns (e.g., the report data source columns defined in 606) is below a threshold, if the output data plotting and graphing is below a certain number of plots and graphs, if the output data processing meets an output data processing criteria, or if the report meets any other appropriate criteria for use as an embedded intelligence applet. In some embodiments, the determination of whether the report can be used as an embedded intelligence applet is only made after an indication by a user that the report is to be used as an embedded intelligence applet. If it is determined that the report cannot be used as an embedded intelligence applet, the process ends. If it is determined that the report can be used as an embedded intelligence applet, control passes to 614. In 614, the report is enabled as an embedded intelligence applet. In various embodiments, enabling the report as an embedded intelligence applet comprises storing the report with an indicator that it is an embedded intelligence applet, adding the report name to a list of available embedded intelligence applets, causing the report to appear in embedded intelligence applet search results, notifying users of the availability of the embedded intelligence applet, or enabling the report as an embedded intelligence applet in any other appropriate way.

Figure 7:
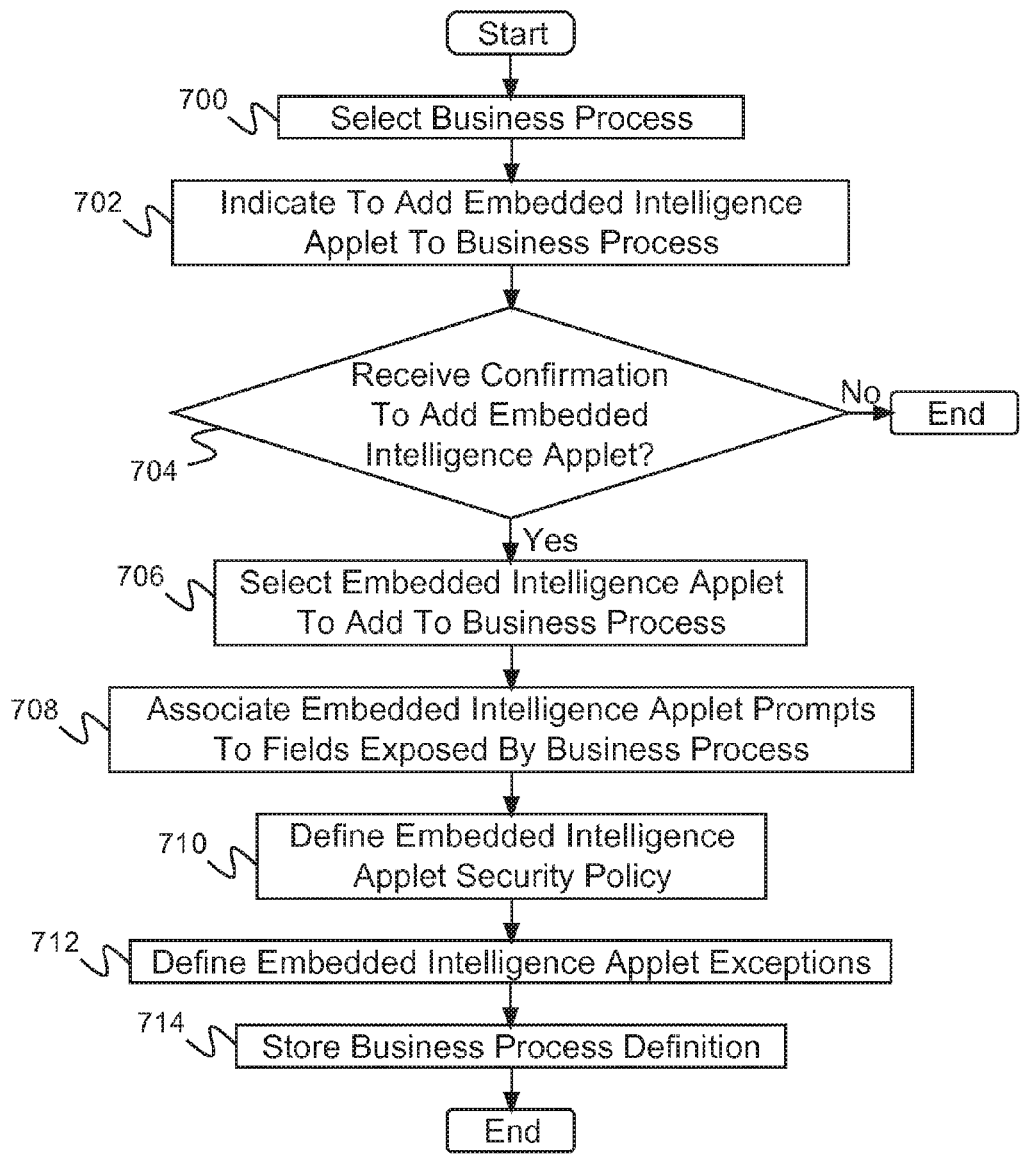
FIG. 7 is a flow diagram illustrating an embodiment of a process for associating an embedded intelligence applet with a business process.

FIG. 7 is a flow diagram illustrating an embodiment of a process for associating an embedded intelligence applet with a business process. In some embodiments, the process of FIG. 7 is executed by a database system engineer (e.g., database system engineer 102 of FIG. 1). In some embodiments, the process of FIG. 7 is executed by a database system administrator (e.g., database system administrator 104 of FIG. 1). In some embodiments, the process of FIG. 7 implements 404 of FIG. 4. In the example shown, in 700, a business process is selected. In various embodiments, a business process is selected from a list of business processes, from a category tree of business processes, from a set of search results for business processes, by typing the name into a business process name field, or in any other appropriate way. In 702, initiation of the addition of an embedded intelligence applet to the business process is indicated. In various embodiments, initiation of addition of an embedded intelligence applet to the business process is indicated by clicking a button, by selecting an element from a menu, by typing a command, or in any other appropriate way. In some embodiments, in response to the indication to initiate addition of the embedded intelligence applet to the business process, addition of the embedded intelligence applet to the business process is initiated. In 704 it is determined whether confirmation to add the embedded intelligence applet was received. In some embodiments, confirmation to add the embedded intelligence applet is received if it is determined that the user is able to add an embedded intelligence applet to the business process. In various embodiments, the user is able to add an embedded intelligence applet to the business process if the user has appropriate user access priority, if the user has an appropriate position in the employee hierarchy, if there is data storage space available, if the business process is enabled for addition of an embedded intelligence applet, or for any other appropriate reason.

In 706 an embedded intelligence applet is selected to add to the business process. In various embodiments, an embedded intelligence applet is selected from a list of embedded intelligence applets, from a category tree of embedded intelligence applets, from a set of search results for embedded intelligence applets, by typing the name into an embedded intelligence applet name field, or in any other appropriate way. In some embodiments, the user is given the option to create a new embedded intelligence applet to add to the business process. In some embodiments, when an embedded intelligence applet is selected to add to the business process, a reference to the embedded intelligence applet is added to the business process definition.

In 708, embedded intelligence applet prompts are associated with fields exposed by the business process. In some embodiments, embedded intelligence applet prompts comprise input data prompts that affect the output data displayed by the embedded intelligence applet. In some embodiments, embedded intelligence applet prompts comprise data prompts as defined in 608 of FIG. 6. In various embodiments, embedded intelligence applet prompts are selected from a list of embedded intelligence applet prompts, from a category tree of embedded intelligence applet prompts, from a set of search results for embedded intelligence applet prompts, by typing the name into an embedded intelligence applet prompts name field, or in any other appropriate way. In some embodiments, fields exposed by the business process comprise data exposed by a business object (e.g., a business object as in business object 320 of FIG. 3) and accessible by embedded intelligence applets. In various embodiments, fields exposed by the business process comprise data entered into the business process (e.g., into business process step data entry fields as defined in 504 of FIG. 5), a processed version of data entered into the business process, data extracted from data storage (e.g., business data storage 206 of FIG. 2), a processed version of data extracted from data storage, or any other appropriate data. In some embodiments, fields exposed by the business process comprise business object exposed data as defined in 510 of FIG. 5. In various embodiments, business process exposed fields are selected from a list of business process exposed fields, from a category tree of business process exposed fields, from a set of search results for business process exposed fields, by typing the name into a business process exposed fields name field, or in any other appropriate way. In some embodiments, associating embedded intelligence applet prompts with fields exposed by the business process comprises determining the embedded intelligence applet prompts. In some embodiments, associating embedded intelligence applet prompts with fields exposed by the business process comprises determining the business process exposed fields. In some embodiments, the prompt of the embedded intelligence applet is one of a plurality of prompts of the embedded intelligence applet. In some embodiments, the exposed field of the business process is one of a plurality of exposed fields of the business process. In some embodiments, associating embedded intelligence applet prompts with fields exposed by the business process comprises assigning data output fields made available by the business process to embedded intelligence applet inputs. In some embodiments, associating embedded intelligence applet prompts with fields exposed by the business process comprises causing the embedded intelligence applet prompts to be connected to receive data from business process exposed fields upon execution of the business process. In some embodiments, when embedded intelligence applet prompts are associated with fields exposed by the business process, a reference to the embedded intelligence applet prompts and associated business process exposed fields is added to the business process definition.

In 710, an embedded intelligence applet security policy is defined. In some embodiments, an embedded intelligence applet security policy comprises a limitation of the database system users (e.g., database system users such as database system user 106 of FIG. 1) who are able to access the embedded intelligence applet to only a subset of database system users. For example, the data available to the embedded intelligent applet comprises data available to the user according the security policy (e.g., personal data or data associated with the user, data available to the role the user is associated with, etc.). In various embodiments, the subset of database system users comprises only users of a specific employee type, only users above a certain position in an employee hierarchy, only users in a specific business location, only users with a particular manager, only users with a specific access priority or with access priority above a certain level, only a specific list of users, or only a subset of users defined in any other appropriate way. In some embodiments, when the embedded intelligence applet security policy is defined, a reference to the embedded intelligence applet security policy is added to the business process definition. In 712, embedded intelligence applet exceptions are defined. In some embodiments, embedded intelligence applet exceptions comprise conditions that must be satisfied for the embedded intelligence applet to run. In various embodiments, embedded intelligence applet exceptions comprise determining if a variable is equal to a specific value, determining if a variable is in a particular range, determining if a particular piece of data is defined, determining if the processed version of a variable is not equal to zero, or any other appropriate embedded intelligence applet exception. In various embodiments, embedded intelligence applet exceptions comprise showing an employee salary graph embedded intelligence applet if a particular employee's salary is greater than $100,000, showing an employee organization chart if a particular employees division is labeled as management, not showing an employee history embedded intelligence applet if an employee has been employed less than three months, or any other appropriate embedded intelligence applet exception. In some embodiments, when the embedded intelligence applet exceptions are defined, a reference to the embedded intelligence applet exceptions is added to the business process definition. In 714, the business process definition is stored. In some embodiments, storing the business process definition comprises storing an associated set of references. In various embodiments, storing the business process definition comprises storing references to an embedded intelligence applet, to embedded intelligence applet prompts and associated business process exposed fields, to an embedded intelligence applet security policy, to embedded intelligence applet exceptions, or to any other appropriate references. In some embodiments, the business process definition is stored in a business data storage (e.g., business data storage 206 of FIG. 2). In some embodiments, storing the business process definition with a reference to the associated embedded intelligence applet causes the embedded intelligence applet to run when the business process is run. In some embodiments, storing the business process definition with a reference to the associated embedded intelligence applet causes the selections, connections, and definitions made as part of the process of FIG. 7 to be stored as part of the business process definition. In some embodiments, storing the business process definition with a reference to the associated embedded intelligence applet causes the embedded intelligence applet to be executed with prompts connected to receive data from business process exposed fields upon execution of the business process. In some embodiments, storing the business process definition with a reference to the associated embedded intelligence applet causes the embedded intelligence applet to act upon received data (e.g., data received from business process exposed fields) and display output data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
 a processor configured to:
  create an embedded intelligence applet including:
   create a blank report;
   determine whether the blank report is usable as the embedded intelligence applet based on at least one of: a number of columns in the blank report being below a column threshold and output of the blank report meets a criteria; and
   if the blank report is usable as the embedded intelligence applet, enable the blank report as the embedded intelligence applet;
  associate a prompt of the embedded intelligence applet with an exposed field of a process, wherein the embedded intelligence applet is configured to generate a report based on the exposed field;
  store a definition of the process and an association, wherein the association indicates a relationship between the process and the embedded intelligence applet; and
  in the event an indication to execute the process is received, automatically provide the embedded intelligence applet to generate the report, wherein the embedded intelligence applet is integrated with the process; and
 a memory coupled to the processor and configured to provide the processor with instructions.

2. The system of claim 1, wherein storing the definition of the process comprises storing an associated set of references.

3. The system of claim 1, wherein the prompt of the embedded intelligence applet comprises an input data prompt that affects output data displayed by the embedded intelligence applet.

4. The system of claim 1, wherein the exposed field of the process comprises a data field exposed by an object and accessible by the embedded intelligence applet.

5. The system of claim 1, wherein associating the prompt of the embedded intelligence applet with the exposed field of the process comprises causing the prompt of the embedded intelligence applet to be connected to receive data from the exposed field upon execution of the process.

6. The system of claim 1, wherein the embedded intelligence applet comprises software for analyzing data and preparing the report.

7. The system of claim 1, wherein the process comprises software for executing a task.

8. The system of claim 1, wherein the processor is further configured to receive a process selection.

9. The system of claim 1, wherein the processor is further configured to receive an embedded intelligence applet selection.

10. The system of claim 1, wherein the processor is further configured to determine the prompt of the embedded intelligence applet.

11. The system of claim 1, wherein the processor is further configured to determine the exposed field of the process.

12. The system of claim 1, wherein the processor is further configured to receive an indication of an embedded intelligence applet security policy.

13. The system of claim 12, wherein the policy is based at least in part on an employee type, on a position in an employee hierarchy, on an access priority, on a manager, or on a list of users.

14. The system of claim 1, wherein the processor is further configured to receive an indication of an embedded intelligence applet exception.

15. The system of claim 1, wherein the processor is further configured to, upon execution of the process, cause the embedded intelligence applet to be executed with data prompts connected to receive data from process exposed fields.

16. The system of claim 15, wherein the processor is further configured to, upon execution of the embedded intelligence applet, act upon received data and display output data.

17. The system of claim 15, wherein the processor is further configured to, upon execution of the embedded intelligence applet, access personal data from a database.

18. The system of claim 1, wherein the processor is further configured to receive an indication to add an embedded intelligence applet to the process.

19. The system of claim 1, wherein the processor is further configured to determine whether to add an embedded intelligence applet to the process.

20. A method comprising:
creating an embedded intelligence applet including:
creating a blank report;
determining whether the blank report is usable as the embedded intelligence applet based on at least one of: a number of columns in the blank report being below a column threshold and output of the blank report meets a criteria; and
if the blank report is usable as the embedded intelligence applet, enabling the blank report as the embedded intelligence applet;
associating a prompt of the embedded intelligence applet with an exposed field of a process, wherein the embedded intelligence applet is configured to generate a report based on the exposed field;
storing a definition of the process and an association, wherein the association indicates a relationship between the process and the embedded intelligence applet; and
in the event an indication to execute the process is received, automatically executing the embedded intelligence applet to generate the report, wherein the embedded intelligence applet is integrated with the process.

21. A computer program product, the computer program product being embodied in a non-transitory computer readable storage medium and comprising computer instructions for:
creating an embedded intelligence applet including:
creating a blank report;
determining whether the blank report is usable as the embedded intelligence applet based on at least one of: a number of columns in the blank report being below a column threshold and output of the blank report meets a criteria; and
if the blank report is usable as the embedded intelligence applet, enabling the blank report as the embedded intelligence applet;
associating a prompt of the embedded intelligence applet with an exposed field of a process, wherein the embedded intelligence applet is configured to generate a report based on the exposed field;
storing a definition of the process and an association, wherein the association indicates a relationship between the process and the embedded intelligence applet; and
in the event an indication to execute the process is received, automatically executing the embedded intelligence applet to generate the report, wherein the embedded intelligence applet is integrated with the process.

22. The system of claim 1, wherein the definition of the process comprises the prompt of the embedded intelligence applet and the exposed field of the process.

23. The system of claim 1, wherein the embedded intelligence applet comprises a laterally relevant data, a background data, or a forecasted data of the process.

24. The system of claim 1, wherein the provision of the embedded intelligence applet to generate the report does not require an application external to the process.

* * * * *